(12) United States Patent
Calender

(10) Patent No.: US 6,386,560 B2
(45) Date of Patent: May 14, 2002

(54) DOLLY FOR LARGE APPLIANCES

(76) Inventor: Joseph P. Calender, 347 Gillahan Rd., Ledbetter, KY (US) 42058

( * ) Notice: Subject to any disclaimer, the term of this patent is extended or adjusted under 35 U.S.C. 154(b) by 0 days.

(21) Appl. No.: 09/933,114

(22) Filed: Aug. 21, 2001

Related U.S. Application Data

(63) Continuation-in-part of application No. 09/557,976, filed on Apr. 25, 2000, now abandoned.

(51) Int. Cl.$^7$ ................................................. B62B 3/04
(52) U.S. Cl. ................................ 280/47.34; 280/79.11; 414/373
(58) Field of Search ............................... 280/35, 43.11, 280/43.12, 79.11, 47.34, 651; 414/809, 373; 254/120, 131

(56) References Cited

U.S. PATENT DOCUMENTS

| | | | |
|---|---|---|---|
| 1,175,312 A | | 3/1916 | Simpson |
| 2,132,316 A | * | 10/1938 | Newton ........................ 280/35 |
| 2,229,244 A | | 1/1941 | Husted |
| 2,414,277 A | | 1/1947 | Shepard, Jr. et al. |
| 2,424,032 A | * | 7/1947 | Henderson .................... 280/35 |
| 2,969,245 A | | 1/1961 | Wilson |
| 3,024,036 A | * | 3/1962 | Reynolds ..................... 280/35 |
| 3,215,401 A | | 11/1965 | Grabarski |
| 3,633,774 A | | 1/1972 | Lee |
| 3,785,669 A | | 1/1974 | Doheny |
| 3,879,053 A | | 4/1975 | Chvala |
| 4,166,638 A | | 9/1979 | De Prado |
| 4,171,828 A | | 10/1979 | Goodwin et al. |
| 4,213,624 A | | 7/1980 | Sanders |
| 4,277,075 A | | 7/1981 | Shay |
| 4,362,458 A | | 12/1982 | Jantzi |
| 4,768,732 A | | 9/1988 | Greenleaf |
| 5,125,626 A | | 6/1992 | Lonsway et al. |
| 5,257,892 A | | 11/1993 | Branch |
| 5,433,576 A | | 7/1995 | Drew |
| 5,486,014 A | * | 1/1996 | Hough ..................... 280/79.11 |
| 5,556,118 A | | 9/1996 | Kern et al. |
| 5,609,461 A | * | 3/1997 | Lichtenberg ............. 280/79.11 |

FOREIGN PATENT DOCUMENTS

| | | |
|---|---|---|
| EP | 56490 | 7/1982 |
| JP | 5-178211 | 7/1993 |
| JP | 5-221321 | 8/1993 |

\* cited by examiner

*Primary Examiner*—Michael Mar
(74) *Attorney, Agent, or Firm*—Richard C. Litman

(57) ABSTRACT

A dolly for large appliances facilitates manual movement of soft drink vending machines, refrigerators, etc. The dolly has a dropped floor between each end, with the ends raised for installation of casters therebeneath. The lower central floor area is preferably only about 1.5 inches above the lower supporting surface when the dolly is resting thereon, thereby allowing a large machine to be tilted slightly and the dolly maneuvered therebeneath. The low floor also results in a very low ride height for the appliance, enabling the appliance to fit upright through a standard doorway. Carrying the appliance sideways on the dolly, also permits large vending machines to fit through a standard doorway by opening the door of the machine to narrow the effective width of the machine. A roller lever is also provided, for lifting one end of loaded dolly for maneuvering the lifted end across thresholds and other floor discontinuities.

6 Claims, 3 Drawing Sheets

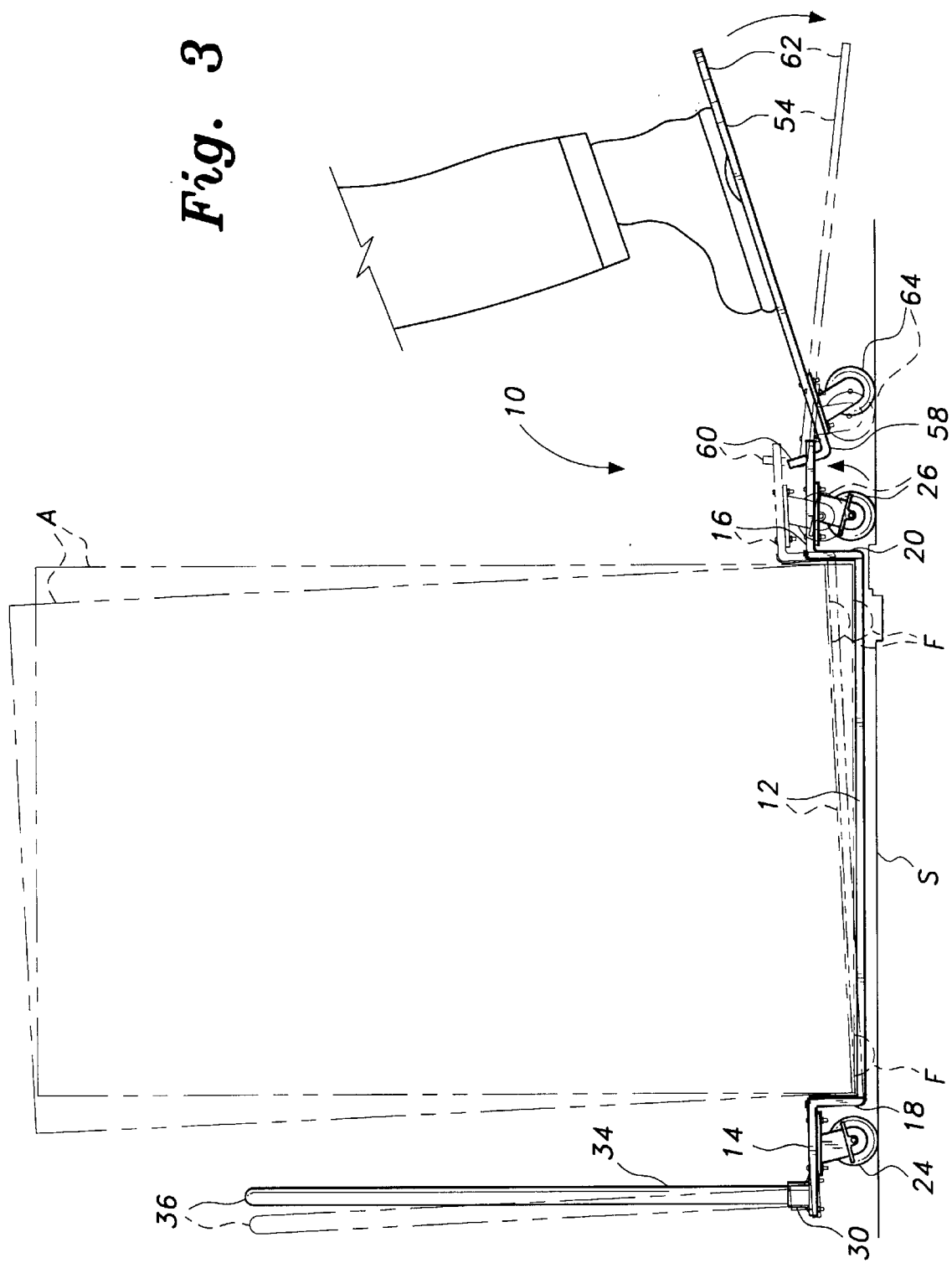

DOLLY FOR LARGE APPLIANCES

REFERENCE TO RELATED PATENT APPLICATION

This application is a Continuation-In-Part of U.S. patent application Ser. No. 09/557,976 filed on Apr. 25, 2000, now abandoned titled "Drink Machine Dolly."

BACKGROUND OF THE INVENTION

1. Field of the Invention

The present invention relates generally to dollies, carts, hand trucks, etc., and more particularly to a dolly configured for movement and carriage of large and heavy appliances (refrigerators, etc.). The present dolly is particularly well adapted for use in moving large refrigerated soft drink vending machines, accommodating their width and height to allow such large machines to pass through a standard doorway while riding on the dolly.

2. Description of the Related Art

Relatively large appliances, such as refrigerators, refrigerated soft drink vending machines, cigarette machines, etc., are quite cumbersome to move from place to place. This is particularly true of machines which include refrigeration systems, as the weight of the compressor motor and other refrigeration components adds considerably to the weight of the machine. Such machines may weigh a half ton, or perhaps even somewhat more.

This is particularly true of soft drink vending machines, which include additional mechanisms (and corresponding weight and bulk) for the vending and money acceptance systems. Additional weight and bulk is required for the protective features of the machine, to prevent theft of money or contents from the machine. These additional mechanisms are generally installed in the door of the machine, thus resulting in a relatively thick door. The door thickness, along with the depth of the remainder of the machine, often results in a machine which is too wide or deep to fit through a standard doorway without swinging the door open, and/or careful maneuvering of the machine. Moreover, the height of such machines is generally quite close to the height of a standard doorway opening, in order to provide as much internal volume as possible. Placing the machine on its side may provide a solution for fitting the machine through a doorway per se, but oftentimes the height or length of the horizontal machine precludes maneuvering in a hallway or the like, and further precludes placement of the machine in a passenger elevator, where no freight elevator is available.

Prior art dollies and the like are generally configured for the transport of more generic articles or devices, and cannot accommodate such a large and heavy machine as a soft drink vending machine. Where such dollies can accommodate such a large and heavy appliance, they do not position the appliance sufficiently low as to fit through a standard doorway in an upright orientation. Moreover, maneuvering of a heavily loaded standard dolly over floor discontinuities (thresholds, etc.) is generally quite difficult.

Accordingly, a need will be seen for a dolly particularly configured for moving large and/or heavy appliances, such as refrigerators, refrigerated soft drink vending machines, etc. The present dolly provides a very low center extending between the caster pairs at each end, to lower the height of a machine carried upright thereon to the maximum extent practicable. The center area of the present dolly may be somewhat narrower than the widths of the wheel assemblies at each end thereof, in order to allow the legs or support feet of the machine to straddle the width of the center area. This allows the machine to ride even lower on the dolly than would be the case if the feet were resting atop the dolly floor. This also provides greater security for the machine resting upon the dolly, as the machine cannot move laterally due to the feet extending downwardly past the floor edge on each side.

The present dolly also includes a removable hand push bar at one end thereof. The bar is easily removed for storing the dolly and bar compactly as desired. A cargo strap may be removably secured to the hand push bar as desired, for even greater security for a machine placed upon the dolly. The present invention also includes means for facilitating movement of the dolly over floor discontinuities (e.g., door thresholds, concrete expansion joints, etc.), by lifting one end of the dolly using a roller lever device to lift the dolly wheels at that end, over the discontinuity.

A discussion of the related art of which the present inventor is aware, and its differences and distinctions from the present invention, is provided below.

U.S. Pat. No. 1,175,312 issued on Mar. 14, 1916 to Howard Simpson, titled "Truck," describes a device for carriage of a large cylindrical object (barrel, tobacco hogshead, etc.). The floor or support area of the Simpson truck essentially comprises two pairs of angles, with each pair joined to form an inverted, generally "T" shaped member having a wide space therebetween, rather than the continuous, unbroken floor of the present dolly. Moreover, the two wheels at each end of the Simpson truck are interconnected, with a steering end having a linkage to turn the two wheels simultaneously by means of a permanently mounted swiveling handle, and the opposite end having the wheels affixed to a single transverse axle. No means is provided by Simpson for lifting either end of his truck over surface irregularities, as provided by the present invention.

U.S. Pat. No. 2,229,244 issued on Jan. 21, 1941 to Earle W. Husted, titled "Dolly," describes a device having two parallel, opposed side members and two opposed, parallel end members, defining a rectangular opening in the center thereof. The four wheels are disposed beneath the lower members, thus resulting in a relatively high ride height for an object placed upon the Husted dolly. In contrast, the present dolly provides an unbroken floor upon which the base of the object being carried rests, with the base of the object being between, rather than over, the support wheels. It is also noted that the vertical side rails which provide for attachment of cargo straps, extend upwardly beyond the large article on the Husted dolly and thus likely preclude fitting the dolly and rails upright through a standard doorway.

U.S. Pat. No. 2,414,277 issued on Jan. 14, 1947 to Frederick J. Shepard, Jr. et al., titled "Floor Truck," describes a device having a solid floor formed of a series of tongue and groove boards secured atop opposed lateral end pieces. The floor of the present truck is formed of a single sheet of metal to provide greater strength and economy of manufacture in comparison to the multipiece floor of the Shepard, Jr. et al. truck. More importantly, the floor of the Shepard, Jr. et al. truck is disposed above the wheels in each embodiment, rather than being lower between the wheels. This results in an excessively high ride height for articles placed upon the Shepard, Jr. et al. truck, particularly in the case of the embodiment of FIGS. 5 through 8 with its larger diameter wheels at one end. It is also noted that only two wheels at one end of the Shepard, Jr. et al. truck caster, thus resulting in poorer maneuverability in comparison to the present dolly with its four castering wheels.

U.S. Pat. No. 2,969,245 issued on Jan. 24, 1961 to Kermit H. Wilson, titled "Device for Transporting And Storing Articles Of Furniture And The Like," describes a folding cart adapted particularly for the carriage of large, round tables and the like. The Wilson cart is constructed of tubular frame members, having a completely open center incapable of supporting a large, heavy object; the articles carried on the Wilson cart must be carried on edge, with their edges supported by opposed crossmembers. No means for lifting one end of the cart for clearance over floor discontinuities, is disclosed by Wilson.

U.S. Pat. No. 3,215,401 issued on Nov. 2, 1965 to Edward J. Grabarski, titled "Wheeled Hand Truck With Transverse Extension Means And Cam Elevating Means," describes a device having a pair of opposed side rails with telescoping lateral rails at each end thereof, defining a rectangular opening therethrough rather than the solid, unbroken floor of the present dolly. Moreover, it is noted that the side rails of the Grabarski truck form a straight line above the wheels, thus placing any article(s) carried thereon, above the wheels. The disadvantages of high placement of tall and/or heavy articles on a dolly or truck have been noted above. It is also noted that Grabarski does not provide a hand push bar or means for lifting one end of his truck over a floor discontinuity, both of which features are a part of the present dolly invention.

U.S. Pat. No. 3,633,774 issued on Jan. 11, 1972 to William S. Lee, titled "Moving Method," describes a very low cart having a small, directionally fixed wheel beneath each corner and two removable caster wheel assemblies which install in transverse slots below the cart floor. A hand lifting lever jack is also provided, for lifting the end opposite the permanent wheels. The Lee device is intended for sliding beneath a very low appliance, with each end being lifted alternately to install the caster wheel assemblies beneath the cart for moving the assembly. Both the smaller, non-steerable permanent wheels and the removable castering wheels of the Lee device are disposed beneath the platform, rather than the platform being depressed below the wheels, as in the present dolly. Also, no hand push bar is provided by Lee.

U.S. Pat. No. 3,785,669 issued on Jan. 15, 1974 to William M. Doheny, titled "Convertible Bulk Hand Truck," describes a device having a generally conventional two wheeled hand truck configuration, with an open frame and two large wheels at one end thereof. A set of permanently installed handles is provided at the opposite end from the large wheels. An adjustably positionable push handle bar is pivotally and slidably secured to the end of the frame opposite the large wheels, with the lower ends of the handle bar having smaller castering wheels. The handle bar may be extended from one end of the cart and pivoted upwardly to support that end by the handle bar caster wheels to configure the device as a four wheeled cart, or may alternatively be stored against the underside of the frame to use the device as a two wheeled hand truck. The constant width open frame, permanently installed handle bar, and lack of means for levering the ends clear of the underlying surface, result in the Doheny hand truck differing considerably from the present invention.

U.S. Pat. No. 3,879,053 issued on Apr. 22, 1975 to William J. Chivala, titled "Mobile Display Cart," describes a four wheeled cart having a flat floor disposed over the wheels. Removable sides are also provided, for enclosing goods stored upon the cart. Chivala also provides tilting means for display of articles on the cart, but no removable push handle bar or means for lifting one end of the cart clear of the underlying surface, is provided by Chivala. The relatively high floor, and other features, render the Chivala cart unsuitable for moving large and heavy appliances.

U.S. Pat. No. 4,166,638 issued on Sep. 4, 1979 to Alfred De Prado, titled "Adjustable Dolly," describes a four wheeled dolly wherein the two opposed side members are slotted to allow the length of the assembly to be adjusted. As a result, the center area is open and cannot provide any support to an article placed thereon. Moreover, the support frame members are disposed above the wheels, unlike the present invention. De Prado does not provide any form of vertically extending hand push bar for his cart, and the cargo securing straps extend from each end of the base, rather than being removably attachable to the vertical hand push bar, as in the present dolly invention. Also, De Prado does not provide any means for levering one end of his cart clear of the underlying surface, as provided by the present invention.

U.S. Pat. No. 4,171,828 issued on Oct. 23, 1979 to Gerald F. Goodwin et al., titled "Textile Tube Dolly," describes a tray comprising two portions each having three wheels therebeneath. The two components are hinged together at one edge thereof, to form a complete dolly having upstanding side walls when the two components are locked together. The Goodwin et al. device differs considerably from the present invention, in that Goodwin et al. places the wheels beneath the floor level of his cart, and provides only a single castering wheel beneath each component. The upstanding side walls preclude placing any large article on the floor of the Goodwin et al. cart, as the sides of the large article could not extend past the edges of the floor due to the sidewalls. Moreover, Goodwin et al. do not provide a push handle bar.

U.S. Pat. No. 4,213,624 issued on Jul. 22, 1980 to Ralph K. Sanders, titled "Pallet Transport System," describes a series of separate forks, each of which have a wheel at one end thereof. The wheeled forks are inserted into the passages in a conventional pallet and the wheels are adjusted downwardly, thereby lifting the pallet off the surface by means of the forks. The wheels are independently selectively castering, as desired. A tongue may be attached to the two wheel assemblies at one end of the pallet, for towing the assembly. The Sanders assembly comprises a series of separate components which have no structural interrelationship, other than by means of the pallet supported thereby and the towing tongue. No means of lifting one end of the assembly for travel over a floor discontinuity, or of attaching a push hand bar thereto, is provided by Sanders.

U.S. Pat. No. 4,277,075 issued on Jul. 7, 1981 to Robert W. Shay, titled "Moving Dolly," describes an elongate frame having two opposed longitudinal members with two opposed end members, defining a rectangular opening therebetween. A conventional cushioned board is placed within the edges of the frame, for supporting a baby grand piano thereon. Casters are provided at each corner of the frame, with a tow bar handle removably attachable to either end of the frame as desired. The wheels are disposed beneath the frame and support board, rather than having the floor of the device disposed between the wheels, as in the present dolly invention. Moreover, Shay does not provide any means of lifting either end of the device for clearance over floor discontinuities.

U.S. Pat. No. 4,362,458 issued on Dec. 7, 1982 to Albert T. Jantzi, titled "Apparatus For Moving Large Heavy Objects," describes a pair of hand trucks having hydraulic jacks for lifting the lift platforms of each truck, relative to the remainder of the structure. Each truck has a pair of relatively large, directionally fixed wheels and another pair of smaller castering wheels. The load may be lifted differentially between the two trucks by using the jacks, thereby tilting the entire load and jack assembly to cause the weight to bear on the larger, directionally fixed wheels of one truck and the smaller castering wheels of the opposite truck. The two separate trucks are more closely related to the multiple wheeled forks of the Sanders '624 U.S. patent, than to the present invention.

U.S. Pat. No. 4,768,732 issued on Sep. 6, 1988 to Joseph M. Greenleaf, titled "Mobile Cable Carrier Convertible To Rotary Dispensing Reel," describes a three wheeled cart having a circular planform with a vertically adjustable central foot or pad. The Greenleaf cart is particularly adapted for carrying a large coil of heavy cable thereon. The three castering wheels allow the cart to be maneuvered to the desired location, with the central pad being lowered to support the cart thereon. The cart can then pivot about the central pad as the cable is dispensed from the cart. The wheels of the Greenleaf cart are disposed beneath the floor of the cart, rather than beside the lowered floor, as in the present dolly. No means of lifting one edge of the cart to maneuver the cart over a floor discontinuity, is provided by Greenleaf.

U.S. Pat. No. 5,125,626 issued on Jun. 30, 1992 to Raymond L. Lonsway et al., titled "Pool Table Dolly," describes a dolly having a peripheral frame connected to a wheeled base by a series of short stroke, mechanical lever jacks. The frame and base are open, and do not form a continuous floor as provided in the present dolly. Moreover, the peripheral frame precludes the carriage of any large, heavy object having a flat base by the Lonsway et al. dolly, as the object would rest upon the upper edges of the peripheral frame. Lonsway et al. thus teaches away from the present invention with its very low central floor disposed between the peripheral wheels, as the Lonsway et al. dolly is intended to be moved beneath the relatively high underside of a pool table and lift the table slightly from the underlying surface for movement.

U.S. Pat. No. 5,257,892 issued on Nov. 2, 1993 to David Branch, titled "Multiple Purpose Transporting Device," describes a cart or truck convertible between a low, horizontal four wheel platform and a conventional two wheeled hand truck. Handle bars are interchangeably installable at either end of the device, to lever the horizontal cart upwardly when a load is secured thereto, or to guide the device as in a conventional two wheeled hand truck. The platform of the Branch device is raised above the wheels when all four wheels are resting upon the surface, unlike the present dolly invention. Moreover, Branch does not provide any form of roller lever for lifting either end of his truck or platform. Rather, he utilizes the handle bars to lift either end directly; no mechanical advantage is provided by the handles of the Branch cart.

U.S. Pat. No. 5,433,576 issued on Jul. 18, 1995 to Wilbur Drew, titled "Low Profile Dolly And Ramp Assembly For A Roll," describes a dolly for moving large rolls of web paper material from place to place. The Drew dolly has a pair of facing, shallowly inclined floor surfaces defining a shallow lateral trough therebetween. Casters are provided at each end of the dolly, beneath the raised ends of the two floor surfaces, and a vertical handle bar is provided at one end of the device. The sloping floor with its ends disposed above the casters is unlike the lowered floor of the present dolly, and it is also noted that Drew does not provide any means of levering either end of his dolly upwardly for assistance in crossing any floor discontinuities, as provided by the present dolly invention.

U.S. Pat. No. 5,556,118 issued on Sep. 17, 1996 to Alan R. Kern et al., titled "Flat Bed Cart," describes a relatively conventional cart having a floor or bed formed of a molded resin material. As such, the floor is relatively thick, and is raised considerably above the underlying surface due to a pair of centrally disposed, relatively large diameter wheels positioned beneath the floor. A pair of push handle bars is provided at each end of the device, with at least one pair being removably installable in sockets provided. However, Kern et al. do not provide any means of levering any of the wheels of their cart above the underlying floor surface for clearing any floor discontinuities, as provided by the present dolly invention.

European Patent Publication No. 56,490 published on Jul. 28, 1982 to Reinhold Rose describes (according to the English abstract and drawings) a hand truck having a series of idler wheels surrounded by a track, immediately adjacent each of the two main wheels. The tracked wheels enable the device to be used on stairs and over other irregular terrain. A set of relatively rigid shoulder bars extend from the opposite end of the device from the wheels, for moving the device and article(s) thereon up a flight of stairs. Ropes and hand grips may be provided, for additional assistance in carrying heavy objects up a flight of stairs. However, no disclosure is made in the '490 German Patent Publication of four peripheral wheels with a solid, unbroken floor disposed between the wheels, nor of any device providing mechanical leverage advantage for lifting one end of the device clear of the underlying surface, as provided by the present dolly invention.

Japanese Patent Publication No. 5-178,211 published on Jul. 20, 1993 to Kiyomi Asada describes (according to the English abstract and drawings) a cart having a floor disposed over the four wheels of the device, with a handle bar at one end thereof. The upper surface of the floor has tracks disposed therein, for capturing the wheels of another cart therein for transport and storage of the second cart. The irregular upper surface of the floor, relatively wide floor, and lack of any means for levering one end of the device to lift the wheels above the underlying surface, result in a device which differs considerably from the present dolly invention.

Finally, Japanese Patent Publication 5-221,321 published on Aug. 31, 1993 to Eizo Inaba describes (according to the English abstract and drawings) a hand cart having sled runners disposed therebelow. The runners may be selectively raised or lowered above or below the lower portions of the wheels, as desired, depending upon the terrain to be negotiated. Stepping on a foot activated lever, lowers the runners below the wheels for operation on snow or the like. However, all of the wheels and runners are disposed beneath the floor surface, rather than having a lower central floor surface extending between the wheels, as in the present dolly invention. Moreover, the lever of the '321 Japanese cart does not serve to lift the wheels of either end of the device clear of the underlying surface, but rather pushes the runners downwardly simultaneously to lift all of the wheels of the device clear of the underlying surface. The '321 Japanese cart is still supported throughout its length, either by wheels or by runners, depending upon the actuation of the foot lever.

None of the above inventions and patents, taken either singularly or in combination, is seen to describe the instant invention as claimed. Thus a dolly for large appliances solving the aforementioned problems is desired.

SUMMARY OF THE INVENTION

The present invention is a dolly or hand cart for moving large appliances (e.g., refrigerated soft drink vending machines, refrigerators, etc.) for installation or removal from a site. The present dolly is particularly well suited for use in moving and maneuvering such large and heavy machines in the indoor environment, as in offices, cafeterias, etc. where such machines may be installed. The present dolly includes a dropped center floor area, with pivoting casters disposed at each corner thereof beneath a raised end portion at each end of the dropped center floor. The center floor is only about 1.5 inches above the underlying surface when the dolly is resting on that surface, in order to provide the lowest possible overall height when a machine is carried upright on the dolly, for overhead clearance through standard doorways. The carriage of the machine in an upright orientation on the present dolly, allows the dolly and a machine placed thereon to fit within a standard passenger elevator where no freight elevator is available.

The low height of the dolly floor provides an additional benefit in that it greatly facilitates loading a large and heavy article on the dolly. A drink vending machine, refrigerator, etc. need only be tilted slightly from the vertical to position the low floor of the dolly therebeneath. The machine is then allowed to return to the vertical, whereupon it rests upon the central floor of the dolly. The process is reversed when the machine has been moved to its desired location.

The central floor area is relatively narrower than the end panels with their caster wheels, in order to allow the supporting feet of the machine to straddle the central floor area to prevent the machine from sliding from the dolly. The raised ends, with their casters, preclude movement of a drink machine or the like carried upon the dolly, toward either end of the dolly. A removable push handle bar is also provided, with a removable cargo strap which may be used if further security is desired.

Conventional drink vending machines, refrigerators, etc. typically have a considerably greater lateral width than their fore and aft depth. The present dolly carries such machines with their narrower depth disposed laterally across the dolly, which enables the dolly and machine to be maneuvered through a standard doorway. Where the depth of a vending machine may still be too wide for the doorway, the door of the vending machine is swung open to reduce the overall lateral dimension or depth of the machine for movement through doorways.

The present dolly provides additional ease of maneuvering across doorway thresholds and other floor discontinuities (expansion joints, etc.), by means of a roller lever which may be used to lift one end of the loaded dolly to lift its wheels over the floor discontinuity. The roller lever, along with the remaining two wheels of the dolly which still rest upon the underlying surface, are rolled to maneuver the raised end of the dolly across the floor discontinuity. The roller lever is then removed to continue the transport of the machine on the dolly.

Accordingly, it is a principal object of the invention to provide a dolly for moving large appliances, with the dolly having a generally rectangular planform with a caster beneath each corner, and a dropped central floor area between each end.

It is another object of the invention to provide a large appliance dolly wherein the central floor area is narrower than the opposite ends and narrower than the standard fore and aft spacing of the feet of a conventional vending machine, in order for the feet to straddle the lateral edges of the floor area for precluding movement of the machine during carriage on the dolly.

It is a further object of the invention to provide a roller lever engageable with either end of the dolly, to lift that end of the dolly above any floor discontinuities and allow the dolly to roll and carry the raised casters across the discontinuity.

Still another object of the invention is to provide a dolly for large appliances including a removably installable push handle bar, with a cargo strap removably securable to the handle bar for greater security for an appliance carried on the dolly as required.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a side elevation view of the present dolly and roller lever, showing the lifting of one end of the dolly for maneuvering the dolly and appliance thereon over a floor discontinuity.

Similar reference characters denote corresponding features consistently throughout the attached drawings.

DETAILED DESCRIPTION OF THE PREFERRED EMBODIMENT

The present invention is a dolly (i.e., hand truck or cart) adapted particularly for use in moving large and/or heavy appliances. The present appliance dolly is configured particularly to facilitate the moving of such large appliances as refrigerated soft drink vending machines, with their weight and bulk due to their refrigeration systems, internal volume and capacity, and automated mechanisms for handling transactions and dispensing products. However, it will be seen that the present dolly is also readily adaptable for use in moving and handling other large, heavy, and/or bulky appliances, such as refrigerators, cigarette and candy vending machines, etc.

Figure 1:
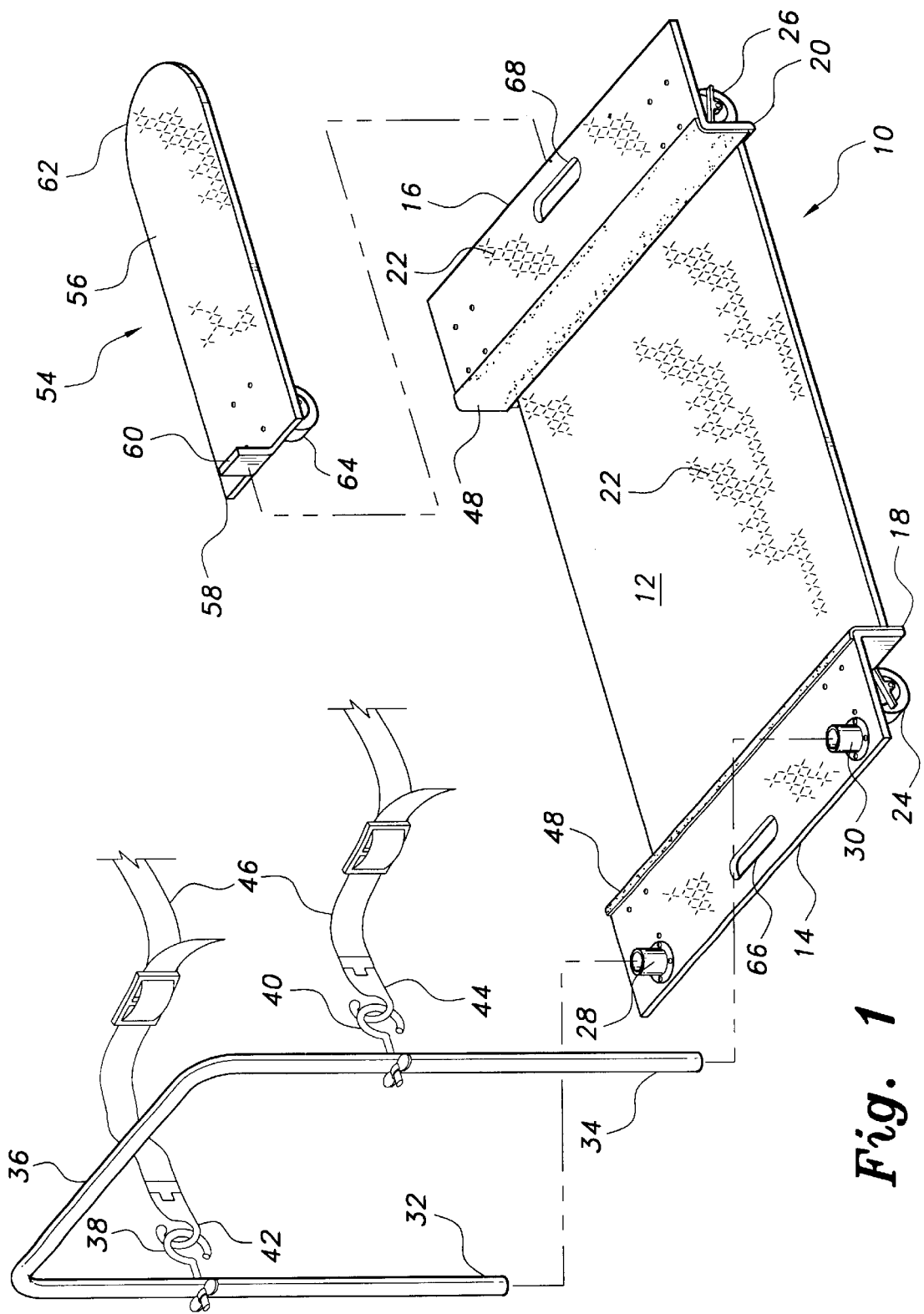
FIG. 1 is an exploded perspective view of a dolly for large appliances according to the present invention, showing its various features and accessories.

FIG. 1 of the drawings provides a perspective view of the present dolly 10, showing its features and accessories. The dolly 10 is generally formed of a relatively thick, single, solid, unbroken, unitary metal plate (e.g., ⅜ inch thick), in order to provide the desired strength to support an object which may weigh on the order of a half ton. The heavy metal plate comprising the basis of the dolly 10 includes a relatively low central floor area 12 with relatively higher opposed first and second end panels, respectively 14 and 16, parallel to the floor 12. The two ends 14 and 16 are bent upwardly from the central floor portion 12, with an intermediate panel, respectively 18 and 20, normal to the central floor 12 and the two end panels 14 and 16. The central floor 12, opposite ends 14 and 16, and intermediate panels 18 and 20 are formed from a single, monolithic heavy plate of steel, as noted further above, with at least the upper surface of the steel plate having a non-skid, diamond pattern finish 22, as is known in the art and used in such applications as truck bumpers, etc.

Each of the raised ends 14 and 16 includes a pair of castering wheels therebeneath, with the first end 14 having casters 24 with brake means provided therewith (e.g., conventional toe operated brake levers on the axles). The opposite second end caster wheels 26 are preferably free rolling at all times, and are not equipped with brakes. Relatively large, four inch caster wheels 24 and 26 are used, for adequate support of heavy loads on the dolly 10.

Each of the castering wheels 24 and 26 rotates on a conventional axle. The central floor area 12 of the dolly is dropped relative to the end panels 14 and 16 sufficiently to place the height of the central floor 12 below the axles of the wheels 24 and 26, to provide a low ride height for an appliance or other article placed upon the central floor area 12 of the dolly 10. The relatively low height of the central floor 12 relative to the underlying surface and relative to the two ends 14 and 16 with their underlying caster wheels 24 and 26, is clearly shown in the side elevation view of FIG. 3.

The first end 14 of the dolly 10 is preferably equipped with a pair of spaced apart handle bar sockets extending upwardly therefrom, respectively 28 and 30, at opposite sides or ends thereof, adjacent to (but on the opposite surface from) the first end casters 24. These sockets 28 and 30 are adapted to receive the corresponding two ends 32 and 34 of a somewhat squared off, but generally U-shaped, handle push bar 36. The handle bar ends 32 and 34 fit closely within the corresponding sockets 28 and 30, with no further retaining means being required to hold the handle bar 36 in place. Yet, the handle bar 36 may be lifted easily from and readily installed within the sockets 28 and 30, as desired. The handle bar 36 also includes attachment fittings 38 and 40 (eye hooks, etc.) for removably securing the two ends 42 and 44 of a cargo strap 46 thereto, if so desired, although the present dolly 10 is configured to provide secure placement of a large appliance thereon and the cargo strap 46 is not required for most operations.

Figure 2:
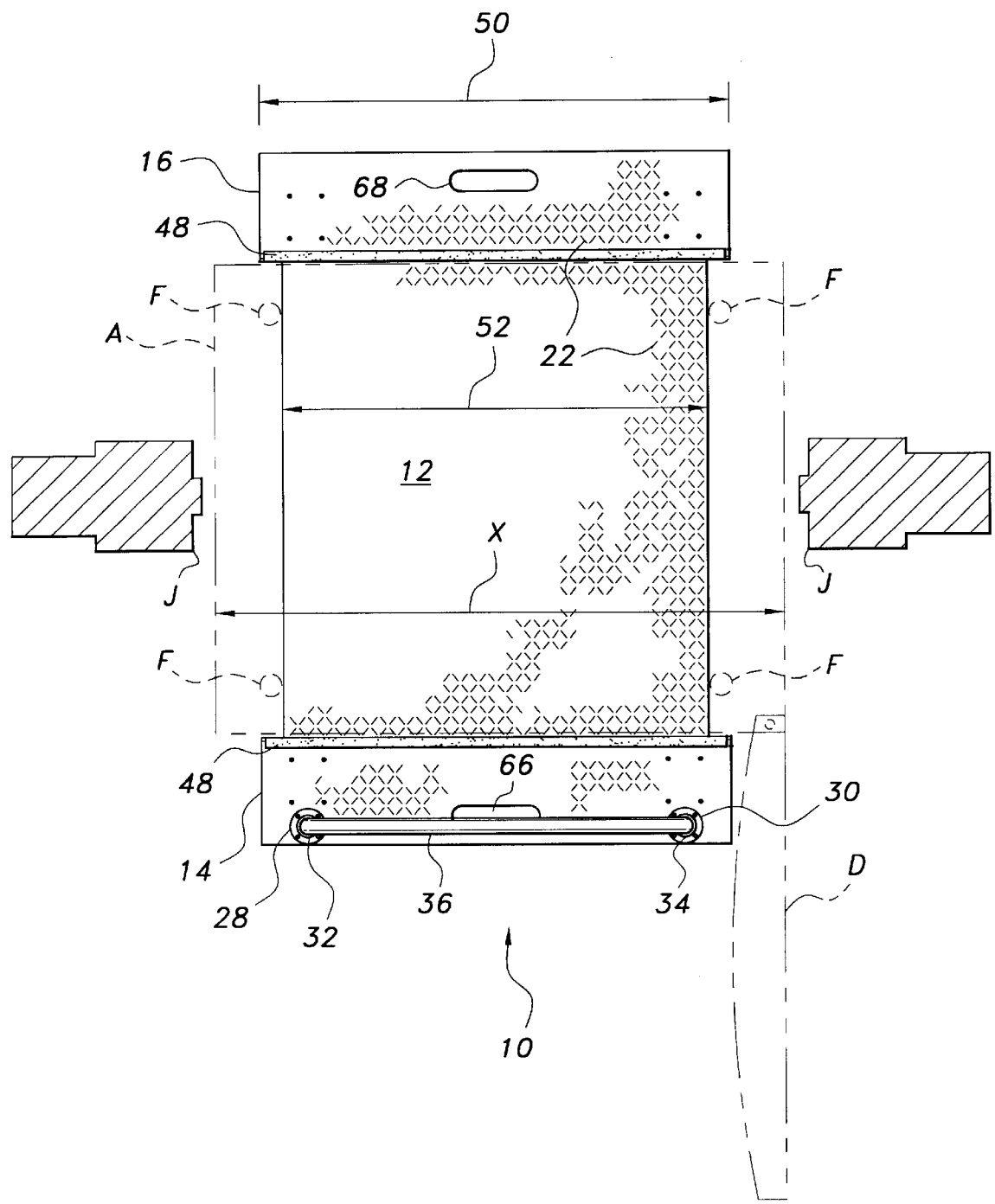
FIG. 2 is a top plan view of the present dolly, showing the maneuvering through a doorway of a large appliance being carried on the dolly.

FIG. 2 is a top plan view of the dolly 10 with an appliance A (e.g., large refrigerated soft drink vending machine) shown in broken lines, resting atop the central floor 12 of the dolly 10. The dolly is configured for placement of such appliances A thereon with the width of the appliance A extending between the two generally vertical intermediate panels 18 and 20 (padding 48 may be placed along the facing edges of the two ends 14, 16 and panels 18, 20 if so desired, to protect the appliance A), and the depth X of the appliance A extending laterally across the width of the dolly 10. As the depth X of such an appliance A is generally the smallest overall dimension, this enables the appliance A to be moved through a typical doorway between the two jambs J, as shown in FIG. 2. The door D of such appliances A is generally relatively thick, and the overall depth of the appliance A with the door D closed is often greater than the width of the doorway between the jambs J. However, the present dolly 10 enables the appliance door D to be swung open, thereby reducing the depth X of the appliance A to fit between the door jambs J, as shown in FIG. 2.

The present dolly 10 includes further features providing compatibility and security for large appliances being carried thereon. It will be noted in FIG. 2 that the overall width 50 of the dolly 10, established by the width of the two raised ends 14, 16 and vertical intermediate panels 18, 20, is narrower than the laterally disposed depth X of the appliance A. It will be further noted that the width 52 of the central floor portion 12 of the dolly 10, is narrower than the ends 14, 16 and panels 18, 20.

Most large drink vending machines are constructed to very nearly the same dimensions, with those dimensions being limited by the width and height of conventional doorways, i.e., about thirty five inches wide between jambs and about eighty three inches high from threshold to the lintel jamb. Doorway dimensions may vary somewhat from these, but the above dimensions are typical, with drink vending machines such as appliance A being configured only slightly smaller than those dimensions. The largest drink vending machines conventionally constructed, have a height of eighty inches and a depth of about forty two inches with the door closed, with the depth without the door (or with the door opened) reducing to about thirty four inches. (These dimensions are approximate, but almost all such machines will have dimensions equal to or less than the above, in order to fit through conventional doorways.)

Such machines or appliances A are conventionally fitted with a series of four support feet F adjacent the respective bottom corners. These support feet F are generally located a few inches inwardly from the front and rear surfaces of the appliance A and define fore and aft appliance foot spacing, generally as shown in broken lines in FIG. 2. The narrower width 52 of the central floor area 12 of the dolly 10 is predetermined to be slightly narrower than the fore and aft foot spacing of the machine or appliance A, with the support feet F straddling the edges of the central floor area 12 of the dolly 10 in order to preclude lateral movement of the machine or appliance A while positioned on the dolly 10, as shown in FIG. 2.

The typical height of such vending machines very nearly matches the height of a conventional door opening, as noted above. Oftentimes, no more than three inches clearance is provided, even if the machine is resting upon the floor in the doorway. Accordingly, the very low height of the central floor area allows a vending machine or appliance A resting thereon to remain barely clear of the underlying surface, thus providing overhead clearance between the top of the machine and the doorway lintel.

FIG. 3 illustrates the very close clearance between the bottom of the vending machine or appliance A and the underlying surface, when the machine A is resting on the present dolly 10. Normally, the top of the central floor area 12 of the dolly 10 is only one and one half inches above the underlying surface S, i.e., below the axle level of the caster wheels 24 and 26, as can be seen clearly in FIG. 3. The support feet F of the machine or appliance A extend downwardly beneath the bottom of the machine on the order of three quarters of an inch to an inch, to straddle the edges of the central floor area 12. The result is that the machine or appliance A resting atop the central floor area of the present dolly 10, is no more than about an inch, or perhaps less, higher than it would be if it were resting directly upon the underlying surface. This very low "ride height" for a machine or appliance A placed atop the central floor area 12 of the present dolly 10, provides just sufficient clearance above the underlying surface S while still keeping the machine low enough to clear the lintel jamb of the typical or conventional doorway.

Floors, doorways, and other surfaces over which the present dolly will be used, typically have various discontinuities and/or irregularities therein (threshold plates, sliding door travel tracks, concrete expansion joints, etc.). It can be extremely difficult to maneuver conventional heavily loaded dollies, hand trucks, and the like, across such irregularities, such as the door threshold T shown in FIG. 3 of the drawings. The present dolly 10 provides a solution for this problem, by means of a roller lever 54 which may be used to lift either end 14 or 16 of the dolly 10, thereby lifting the corresponding caster wheels 24 or 26 clear of the underlying surface S for maneuvering over a threshold T or other surface irregularity.

The roller lever 54 comprises a flat plate 56 having a first or dolly engaging end 58 with a tongue 60 extending upwardly therefrom, and an opposite or lever end 62. A caster wheel 64 is installed beneath the first end 58, with the caster wheel 64 serving as a fulcrum when the roller lever 54 is used to lift one of the ends 16 or 18 of the dolly 10. A lateral slot, respectively 66 and 68, is formed in the first end 14 and second end 16 of the dolly 10.

When it is necessary to lift one end over a surface discontinuity T, the tongue 60 of the roller lever 54 is inserted into the appropriate slot (e.g., the second slot 68, not shown in FIG. 3), and the relatively long second or lever end 62 of the roller lever is forced downwardly as by stepping on the end 62, thereby lifting the end (e.g., second end 16) of the dolly 10.

At this point, only the first caster wheels 24 of the dolly 10 and the single caster wheel 64 of the roller lever 54 remain on the surface S, with the second caster wheels 26 closest to the roller lever 54 being lifted clear of the underlying surface S. This enables the second wheels 26 to be moved across the threshold T or surface discontinuity without engaging the discontinuity, and lowered to the surface on the opposite side of the discontinuity. The tongue 60 of the roller lever 54 is removed from the corresponding slot, e.g. slot 68, by lifting the second or lever end 62 of the roller lever 54 upwardly and disengaging the tongue 60 from the slot 68. This procedure may be repeated as required, at either end 14 or 16 of the dolly 10 with its corresponding slot 66 or 68, until the machine or appliance A has been transferred to the desired location.

In conclusion, the present dolly for large appliances provides a much needed tool for use in the vending machine and appliance installation industries. The present dolly, with its specific dimensions for holding a large vending machine thereon, is particularly suited for use in the vending machine maintenance field, although it is also readily suitable for use in moving other large appliances (refrigerators, etc.) as well. The low floor of the device, along with its relatively narrow width, serve to position machines and appliances squarely thereon in an upright position and at a height so they may be maneuvered readily through standard size doorways without resorting to additional physical force or equipment, or risking marring or damaging the machine.

The roller lever provided with the present dolly provides additional benefit by allowing either end of the dolly to be lifted for clearance while traveling over doorway thresholds and/or other surface discontinuities. Thus, the present dolly reduces physical labor for workers handling such machines, thereby reducing the risk of on the job injuries, while also reducing the risk of damage to a machine or appliance being carried thereon, and/or to the finish of doorways, narrow hallways, and other close quarters where a large machine or appliance may be moved. Accordingly, the present dolly with its roller lever accessory will prove to be a most valuable addition to the tools and equipment used in the large appliance moving field.

It is to be understood that the present invention is not limited to the embodiment described above, but encompasses any and all embodiments within the scope of the following claims.

I claim:

1. A dolly assembly for transporting a large appliance, comprising:
　　a rectangular platform having a first end panel, a second end panel opposite said first end panel, and a planar central floor area therebetween for receiving and supporting a large appliance thereon, each said end panel lying in a plane extending substantially parallel to said central floor area and being higher than said central floor area, said first end panel and said second end panel each having a single slot defined therein;
　　a first pair of supporting caster wheels disposed beneath said first end panel and a second pair of caster wheels disposed beneath said second end panel, each of said caster wheels having an axle, said central floor area being lower than said axle of each of said caster wheels when said caster wheels are resting upon a level supporting surface; and
　　a lever assembly having:
　　　　an elongated flat plate having a first end and a second end, and having a single tongue extending normal to the first end of said plate, the tongue being sized and dimensioned for insertion into either one of the slots defined in said end panels, said flat plate defining a foot platform and being sized and dimensioned for supporting at least one foot of a user of the dolly assembly; and
　　　　a single caster wheel mounted beneath said plate adjacent said tongue, the single caster wheel defining a fulcrum when the tongue is inserted into one of the slots, said flat plate forming a lever pivoting on the fulcrum, the lever having a relatively short lever arm formed between the tongue and the single caster wheel and a relatively long lever arm formed between said single caster wheel and the second end of said flat plate;
　　whereby a dolly user may stand on said flat plate with the tongue inserted into one of the slots, said central platform being supported by and rollable on one of said pairs of supporting caster wheels and on said single caster wheel in order to raise and move the other one of said pair of caster wheels over an obstruction.

2. The dolly assembly according to claim 1, for use with an appliance having a plurality of forwardly and rearwardly disposed support feet therebeneath defining fore and aft appliance foot spacing, wherein:
　　each said end panel has a width; and
　　said central floor area has a width narrower than the width of each said end panel, the width of said central floor area being adapted for placing the appliance on the central floor area with the feet of the appliance straddling said central floor area in order to preclude lateral movement of the appliance upon said central floor area when the appliance is placed sideways thereon.

3. The dolly assembly according to claim 1, further including:
- a pair of opposed handle bar sockets disposed atop said first end panel; and
- a generally U-shaped, push handle bar having a first end and an opposite second end, each end of the handle bar being removably installed within a corresponding one of said pair of opposed handle bar sockets.

4. The dolly assembly according to claim 3, further including:
- means for removably attaching a cargo strap to said push handle bar; and
- a cargo strap removably secured to said push handle bar, for removably securing the appliance to said push handle bar.

5. The dolly assembly according to claim 1, wherein:
- each said end panel has a mutually facing edge; and
- each said edge further includes padding disposed therealong.

6. The dolly assembly according to claim 1, wherein:
- at least said central floor area has an upper surface having a non-skid, diamond pattern finish.

* * * * *